US012522468B2

(12) United States Patent
Villa

(10) Patent No.: US 12,522,468 B2
(45) Date of Patent: Jan. 13, 2026

(54) METHOD AND ARRANGEMENT FOR DETERMINING A CURRENT PRECISE POSITION OF AN ELEVATOR CAR IN AN ELEVATOR HOISTWAY

(71) Applicant: Inventio AG, Hergiswil (CH)

(72) Inventor: Valerio Villa, Colverde (IT)

(73) Assignee: INVENTIO AG, Hergiswil (CH)

( * ) Notice: Subject to any disclaimer, the term of this patent is extended or adjusted under 35 U.S.C. 154(b) by 1027 days.

(21) Appl. No.: 17/597,621

(22) PCT Filed: Jul. 14, 2020

(86) PCT No.: PCT/EP2020/069871
§ 371 (c)(1),
(2) Date: Jan. 14, 2022

(87) PCT Pub. No.: WO2021/013635
PCT Pub. Date: Jan. 28, 2021

(65) Prior Publication Data

US 2022/0274802 A1 Sep. 1, 2022

(30) Foreign Application Priority Data

Jul. 24, 2019 (EP) .................................... 19187983

(51) Int. Cl.
*B66B 1/24* (2006.01)
*B66B 1/34* (2006.01)
*B66B 1/46* (2006.01)

(52) U.S. Cl.
CPC ............ *B66B 1/3492* (2013.01); *B66B 1/462* (2013.01)

(58) Field of Classification Search
CPC ............................. B66B 1/3492; B66B 1/462
USPC ......................................................... 187/394
See application file for complete search history.

(56) References Cited

U.S. PATENT DOCUMENTS 6,437,315 B1 8/2002 Skalski
7,600,613 B2 10/2009 Kang et al.
8,307,953 B2 * 11/2012 Ferreira ................ B66B 1/3492 187/394

(Continued)

FOREIGN PATENT DOCUMENTS

CN 101161580 A 4/2008
CN 101495394 A 7/2009

(Continued)

*Primary Examiner* — Erick D Glass
(74) *Attorney, Agent, or Firm* — Shumaker, Loop & Kendrick, LLP

(57) ABSTRACT

A method and position determining arrangement determine a current precise position of an elevator car driven by a drive engine along a hoistway. An encoder cooperating with the drive engine provides a first signal indicating with a high precision the position of the car within a partial hoistway range extending along a fraction of the entire car travel path. A rough position indicator provides a second signal indicating with a low precision the position of the car within the hoistway. A current rough position of the car is determined based on the second signal and deviating from an exact real position of the car up to an first inaccuracy length; and the current precise position of the car is based on the first signal taking into account the current rough position and deviating from the exact real position up to a second inaccuracy length smaller than the first inaccuracy length.

14 Claims, 2 Drawing Sheets

(56) References Cited

U.S. PATENT DOCUMENTS

| | | | |
|---|---|---|---|
| 8,327,553 | B2 | 12/2012 | Matzker et al. |
| 11,623,841 | B2 * | 4/2023 | Tutat ..................... B66B 1/3453 187/247 |
| 2016/0214832 | A1 | 7/2016 | Banno et al. |

FOREIGN PATENT DOCUMENTS

| | | | |
|---|---|---|---|
| CN | 101500924 | A | 8/2009 |
| CN | 105555697 | A | 5/2016 |
| CN | 108408544 | A | 8/2018 |
| CN | 109789988 | A | 5/2019 |
| EP | 2090541 | A1 | 8/2009 |
| EP | 2652446 | B1 | 1/2017 |
| EP | 3124417 | A1 | 2/2017 |
| ES | 2311388 | A1 | 2/2009 |
| JP | 2018070292 | A | 5/2018 |
| WO | 0170613 | A1 | 9/2001 |
| WO | 2008077980 | A1 | 7/2008 |
| WO | 2010084581 | A1 | 7/2010 |
| WO | 2017013763 | A1 | 1/2017 |
| WO | 2020260346 | A1 | 12/2020 |

* cited by examiner

METHOD AND ARRANGEMENT FOR DETERMINING A CURRENT PRECISE POSITION OF AN ELEVATOR CAR IN AN ELEVATOR HOISTWAY

FIELD

The present invention relates to a method and to a position determining arrangement with which a current position of an elevator car in an elevator hoistway may be determined with high precision.

BACKGROUND

In elevator arrangements, an elevator car is generally displaced along a travel path within an elevator hoistway such that, using the elevator car, passengers may be transported between various levels within a building.

During operation of the elevator arrangement, a current position of the elevator car should be known with high precision such that the elevator car may for example be driven throughout the hoistway and stopped at a specific location with high precision. For example, the elevator car should be stopped at a floor such that a bottom of the elevator car is flush with a bottom of the floor and no potentially dangerous step is formed.

Conventionally, various approaches exist for determining the current position of the elevator car in the hoistway.

For example, position indicators such as a position indicating strip may be installed along the elevator hoistway and a reading device may be attached to the elevator car. Therein, the position indicators may provide information about a specific position within the hoistway and the reading device may read out such information. For example, a position indicating strip may be a magnetic strip on which, at each of multiple positions along the hoistway, information about the specific position is stored magnetically. The information may then be read by a magnetic field reading device.

However, in such approach, various additional components such as the position indicators and the reading device have to be provided and have to be installed in the hoistway and at the elevator car, respectively. Accordingly, additional costs and installation efforts are required.

U.S. Pat. No. 7,600,613 B2 describes an alternative approach. Therein, an apparatus and a method for measuring a position of a movable platform is described as comprising a plurality of RFID tags encoded with location information situated at known locations and a plurality of visual markers situated at precise, known locations. An RF reader attached to the movable platform reads the RFID tags to determine the approximate location of the platform. A camera apparatus attached to the movable platform scans the visual marker. The scanned image is processed to provide the precise position information of the platform.

EP 2090541 A1 describes a further alternative approach using a mechanically engaged zone detection sensor in form of a switch attached to an elevator car to determine the approximate location of the elevator car. An encoder that generates a signal that corresponds to rotation of a drive pulley is used to provide a more precise position of the elevator car.

However, also in this approach, additional components such as the RFID tags, the visual markers and the RF reader have to be provided and installed, thereby adding costs and requiring installation efforts.

There may be a need for a method, for a position determining arrangement and for an elevator arrangement with which a current precise position of an elevator car within an elevator hoistway may be determined using only or at least to a significant extent existing components of the elevator arrangement, thereby adding no or only few costs and/or requiring no or only few additional installation efforts to the entire elevator arrangement.

SUMMARY

Such need may be met with the advantageous embodiments defined in the following specification.

According to a first aspect of the present invention, a method for determining a current precise position of an elevator car driven by a drive engine along an elevator hoistway of an elevator arrangement is proposed. Therein, an encoder, which cooperates with the drive engine, provides a first signal indicating with a high precision the position of the elevator car within a partial hoistway range. The partial hoistway range extends along a fraction of an entire length of a travel path of the elevator car throughout the hoistway. The partial hoistway range is one of a plurality of directly neighboring partial hoistway ranges together extending along the entire length of the travel path. Furthermore, a rough position indicator provides a second signal indicating with a low precision the position of the elevator car within the entire hoistway length. The method comprises at least the following steps, preferably in the indicated order:

determining a current rough position of the elevator car within the entire hoistway length based on the second signal, the current rough position deviating from an exact real position of the elevator car by up to an first inaccuracy length, and determining the current precise position of the elevator car within the entire hoistway length based on the first signal and taking into account the current rough position, the current precise position deviating from the exact real position of the elevator car by up to a second inaccuracy length being smaller than the first inaccuracy length.

According to a second aspect of the invention, a position determining arrangement for determining a current precise position of an elevator car driven by a drive engine along an elevator hoistway of an elevator arrangement is proposed. The position determining arrangement comprises an encoder and a rough position indicator. The encoder cooperates with the drive engine and is configured for providing a first signal indicating with a high precision the position of the elevator car within a partial hoistway range, the partial hoistway range extending along a fraction of an entire length of a travel path of the elevator car throughout the hoistway and the partial hoistway range being one of a plurality of directly neighboring partial hoistway ranges together extending along the entire length of the travel path. The rough position indicator is configured for providing a second signal indicating with a low precision the position of the elevator car within the entire hoistway length. Therein, the position determining arrangement is configured for executing or controlling the method according to an embodiment of the first aspect of the invention.

According to a third aspect of the invention, an elevator arrangement is proposed, the elevator arrangement comprising an elevator car, a drive engine for driving the elevator car along an elevator hoistway and a position determining arrangement according to an embodiment of the second aspect of the invention for determining a current precise position of the elevator car driven within the elevator hoistway.

Ideas underlying embodiments of the present invention may be interpreted as being based, inter alia, on the following observations and recognitions.

A basic concept of the position determining method and arrangement described herein may be seen in, in a first step, determining the current position of the elevator car in the elevator hoistway in a rough manner and then, in a second step, based on this preliminary rough estimation, determining the current precise position of the elevator car. Therein, the current rough position and the current precise position are determined using different techniques.

Up to this point, embodiments of the approach described herein may be similar to conventional approaches such as the approach described in U.S. Pat. No. 7,600,613 B2.

However, in comparison to such conventional approaches, other techniques are used to determine the current rough position and/or the current precise position. Specifically, in the approach described herein, while the current rough position may be determined with one of a variety of different techniques implemented using a so-called rough position indicator, as described further below, the current precise position shall be determined using the first signals provided by an encoder. Such encoder may already be available in existing elevator arrangements for other purposes such that no additional hardware and associated costs and installation efforts are required. Possible details of such encoder will be explained further below.

Furthermore, in comparison to conventional approaches, a manner defining how to use the first and second signals of the encoder and the rough position indicator, respectively, for finally determining the current precise position of the elevator car and/or characteristics of techniques used for generating the first and/or second signals may be different from those of conventional approaches.

Particularly, the rough position indicator determines a so-called absolute position of the car. This means that the rough position indicator can determine the named rough position directly after a start up of the elevator. So, it's not necessary to travel the elevator car inside the elevator hoistway for determining the rough position.

Particularly, according to the invention, based on the second signal, it may be determined, as the current rough position, in which one or neighboring two of the plurality of partial hoistway ranges the elevator car is currently situated. Subsequently, based on the first signal, it may be determined, as the current precise position, where in the selected one or neighboring two partial hoistway ranges the elevator car is currently situated.

In other words, as a first determination step, the rough position at which the elevator car is currently situated may be determined. For that purpose, the second signal provided by the rough position indicator may be analyzed. This second signal may indicate the current position of the elevator car to a rough extent, i.e. with a precision in which the determined current rough position deviates from an exact real position of the elevator car by up to a first inaccuracy length. In other words, the current rough position of the elevator car may be determined based on the first signal of the rough position indicator with an accuracy in which the error bands correspond to the mentioned inaccuracy length. Accordingly, the exact real position of the elevator car may be somewhere in the range between the indicated current rough position minus half the inaccuracy length and the indicated current rough position plus half the inaccuracy length.

Accordingly, the current position of the elevator car may be determined from this second signal at least to an extent such that it may unambiguously be derived in which one of the plurality of partial hoistway ranges or in which two neighboring partial hoistway ranges the elevator car is currently located.

Therein, according to an embodiment, the partial hoistway ranges are longer than the first inaccuracy length.

In other words, the length of the inaccuracy, with which the second signal of the rough position indicator indicates the current position of the elevator car shall be shorter than each one of the partial hoistway ranges within which the current position of the elevator car may be precisely determined using the first signal of the encoder.

Accordingly, as a second determination step, as soon as the current rough position of the elevator car is determined using the second signal of the rough position indicator, the current precise position of the elevator car may be determined within the inaccuracy of this current rough position by subsequently analyzing the first signal provided by the encoder.

Expressed differently, upon having determined the current rough position of the elevator car, it is known in which partial hoistway range or in which portions of two neighboring partial hoistway ranges the elevator car is currently located. The current precise position of the elevator car within this partial hoistway range or these two partial hoistway ranges, respectively, may then be determined using the first signals of the encoder. Therein, as these first signals indicate the position of the elevator car with a significantly higher precision then the second signals, an overall position determination accuracy may be high.

In the following, some possible details of hardware components such as the encoder and the rough position indicator, as well as their characteristics upon being applied in the proposed position determining method will be described.

In the position determining method and arrangement proposed herein, the encoder is a device which cooperates with the drive engine of the elevator arrangement. The encoder is configured for generating its first signals depending on its cooperation with the drive engine and depending on a current positional status of the drive engine. Particularly, the encoder is provided directly at the drive engine. The current positional status of the drive engine may for example correlate with a current orientation of a rotor of a motor of the drive engine. Therein, the positional status of the drive engine may precisely correlate with the precise current position of the elevator car driven by this drive engine.

Upon cooperating with the drive engine, the encoder may determine the current positional status of the drive engine with a very high precision. For example, the orientation of the rotor of the motor of the drive engine may be determined with a precision of less than 1°, preferably less than 0.2° or even less than 0.1°. Accordingly, the current position of the elevator car correlating with this positional status of the drive engine may be determined with a very high precision.

However, due to the technical nature of the encoder and the drive engine, the current position of the elevator car does not correlate with the positional status of the drive engine in such a way that the current position of the elevator car may be determined within an entire length of the travel path of the elevator car throughout the hoistway. Instead, using the encoder and its first signals, the current position of the elevator car may only be determined precisely within a fraction of the entire length of the travel path, this fraction being referred to herein as partial hoistway range. A single partial hoistway range may correspond to a fraction of the entire travel path along which the elevator car may be displaced throughout the hoistway. A single partial hoistway range may for example have a length of between a few centimeters and a few meters, typically between 10 cm and 1 m, whereas the entire travel path may have a length of many meters, several tens of meters or even hundreds of meters. Accordingly, the entire travel path may comprise between several single partial hoistway ranges and hundreds of such single partial hoistway ranges. Each partial hoistway range may directly abut to a neighboring partial hoistway range. Particularly, the partial hoistway range corresponds to the travelled distance by the elevator car during one revolution of the drive engine.

According to an embodiment, the drive engine drives the elevator car by rotating a drive disk engaging with a belt connected to the elevator car. The encoder then generates the first signal such as to unambiguously correlate to a current orientation of the drive disk.

In other words, the drive engine of the elevator arrangement may comprise a motor such as an electric motor. A shaft of such motor may be mechanically coupled to a drive disk, such drive disk sometimes also being referred to as traction sheave. Accordingly, the motor may rotate the drive disk. The rotating drive disk may engage with a belt for displacing the belt. The belt may then be connected to the elevator car such that, by displacing it with the drive engine, the elevator car may be displaced along the travel path.

Generally, the belt may be part of suspension traction means (STM) which serve for both, suspending the weight of the elevator car as well as generating forces onto the elevator car for displacing the elevator car throughout the hoistway.

Alternatively and more preferably, the traction function and the suspension function may be provided by separate means. I.e. suspension ropes or belts may be provided for suspending the weight of the elevator car, whereas one or more driving belts may be provided for displacing the elevator car.

In order to be able to precisely control the operation of the drive engine, the motor of the drive engine is typically provided with an encoder. The encoder may be mechanically connected to a rotating shaft of the motor such that an orientation of the rotor of the motor may be precisely detected. Accordingly, signals generated by the encoder directly and unambiguously correlate with an orientation of the drive disk driven by the drive engine's motor.

In such configuration in combination with a reeving factor of 1:1, the partial hoistway range generally corresponds to the length of the circumference of the drive disk. By rotating the drive disk in a full rotation, i.e. about 360°, the belt engaging with the drive disk and the elevator car connected to the belt are displaced by a length corresponding to this circumference of the drive disk. In a system with a reeving factor of 2:1 the belt engaging with the drive disk and the elevator car connected to the belt are displaced by half of the length corresponding to this circumference of the drive disk by rotating the drive disk in a full rotation.

Accordingly, taking into account the first signals from the encoder, an information about the current orientation of the drive disk may be derived and based on this information, it may be determined at which position the elevator car is currently located within the current partial hoistway range.

Particularly, according to an embodiment, the drive disk may be a toothed drive disk and the belt may be a toothed belt.

An engagement between such toothed drive disk and such toothed belt forms a mechanical positive connection between both components such that no relative slippage may occur between the drive disk and the belt. Accordingly, changes in the first signal provided by the encoder representing changes in the current orientation of the drive disk correlate very precisely and without slippage to displacements of the toothed drive belt and, finally, displacements of the elevator car connected thereto. Accordingly, an overall accuracy of the position determination may be improved and/or maybe highly reliable.

Generally, the rough position indicator used for determining the current rough position of the elevator car within the entire hoistway length may use a variety of position detection techniques.

According to an embodiment of the method presented herein, a learning procedure has been executed prior to normal operation of the elevator arrangement. Therein, during the learning procedure, a correlation relation between the current exact real position of the elevator car and the current first signal is learned at each of multiple positions along the entire travel path of the elevator car. In such embodiment, the method comprises determining the current precise position of the elevator car within the entire hoistway length taking into account the learned correlation relation.

In other words, before the elevator arrangement is set into normal operation, a learning procedure is executed. In this learning procedure, the elevator car may travel in a learning trip along its entire travel path and, at a multiplicity of positions along the travel path, the current exact real position of the elevator car as well as the first signal generated by the encoder may be determined.

The current exact real position may be determined using for example specific hardware such as for example a laser distance measuring device which is attached to the elevator car during the learning trip. Other approaches for determining the current real exact position using for example other measuring techniques and/or hardware may be applicable.

It's also possible to determine the current exact real position using the first signal provided by the encoder. This is particularly applicable in the case that no relative slippage occurs between the drive disk and the belt, i.e. if a toothed belt is used. As long as the position determining arrangement is powered without interruption, the current exact real position can be determined by counting the revolutions of the drive engine supplemented with the first signal indicating the position of the elevator car within a partial hoistway range. So, the current exact real position can be determined starting at a known position, i.e. the bottom of the hoistway by using the first signal provided by the encoder.

The current exact real position and the first signal determined at a same position are then stored as part of the correlation relation. Accordingly, after completing the learning procedure, the correlation relation presents a database in which for each of multiple positions along the travel path of the elevator car, an associated first signal of the encoder is stored.

Later, during normal operation of the elevator arrangement, this correlation relation may then be used upon determining the current precise position of the elevator car.

For example, after the current rough position of the elevator car has been determined using the second signal, the partial hoistway range being situated at this current rough position may be determined and, by comparison of the determined first signal with the learned correlation relation, the current precise position may be determined as the exact real position being stored in the correlation relation database as being associated to the determined first signal.

In addition to the learning procedure described above an additional learn trip for detecting the positions of the floors can be performed. The detected positions are stored in a data base and are used during the normal operation of the elevator arrangement. I. e. the learn trip can performed according the method described in the yet unpublished European Patent Application of the applicant with the application number EP19183108.0 (see WO2020260346A1).

Preferably, according to an embodiment, the rough position indicator may generate the second signal by measuring a distance between a fixed position in the elevator hoistway and the elevator car using a contactless measuring technique.

In other words, the rough position indicator may not need any physical engagement between position measuring components. Instead, a distance between a stationary reference position within the elevator hoistway and the displaceable elevator car may be detected in a contactless manner. Accordingly, disadvantages of contact-based position measurements approaches such as mechanical wear of measurement components, possible distortions of measurement components and/or other effects may be avoided. Various contactless measuring techniques may be applied.

For example, according to an embodiment, the rough position indicator may generate the second signal by measuring a run-time required by an electromagnetic signal for travelling along a distance between a fixed position in the elevator hoistway and the elevator car.

Expressed differently, the second signal may be generated by the rough position indicator as a result of a time-of-flight (TOF) measurement. In such TOF measurement, the time interval between a point in time of emitting an electromagnetic signal at a first end of a distance to be measured and a point in time of receiving or reflecting the electromagnetic signal at a second end of the distance to be determined may be measured. Taking into account the speed with which the electromagnetic signal travels from the first end to the second end of the distance to be determined, the length of the distance to be determined may be calculated based on the measured time interval.

TOF measurements may generally be implemented relatively easily using hardware already existing in elevator arrangements for other purposes. For example, hardware originally used for data or signal communication between the movable elevator car and for example a stationary elevator controller may be used for implementing the TOF measurements.

While TOF measurements generally may be established such that distances along an entire travel path of the elevator car may be measured, establishing such TOF measurements using existing hardware in the elevator arrangement may typically allow only for a minor position detection accuracy. For example, TOF measurements may detect the current position of the elevator car only within an inaccuracy length of for example several centimeters or even several decimeters. However, as long as the inaccuracy length of such TOF measurement is shorter than for example the displacement length about which a drive belt is displaced upon a full rotation of the drive engine's drive disk, such minor accuracy of the TOF measurements may be sufficient for determining the current rough position of the elevator car and, based thereon, subsequently determining the current precise position of the elevator car additionally taking into account the first signal provided by the drive engine's encoder.

The proposed TOF measurement may be implemented using different techniques.

For example, according to an embodiment, the electromagnetic signal may be an ultra-wide-band (UWB) signal.

Ultra-wide-band is a radio technology that can use a very low energy level for short-range, high-bandwidth communications over a large portion of the radio spectrum. UWB may be applied, inter alia, in precision locating and tracking applications. Ultra-wide-band is generally defined as an antenna transmission for which an emitted signal bandwidth exceeds the lesser of 500 MHz or 20% of an arithmetic center frequency.

Applying UWB signals in TOF measurements may enable distance determination with a precision of for example down to less than 30 cm. In other words, the inaccuracy length upon measuring the rough position of the elevator car using UWB-based TOF measurements may be very short such as to be shorter than the length of the partial hoistway ranges being determined for example as the length of the circumference of the drive engine's drive disk.

As an alternative for determining the current rough position of the elevator car, according to an embodiment, the rough position indicator may generate the second signal by measuring a local air pressure at the current position of the elevator car.

As the atmospheric air pressure within the elevator hoistway generally depends on the altitude or level within the hoistway, measuring the local air pressure at the current location of the elevator car may enable deriving information at least roughly indicating the current position of the elevator car. Therein, the air pressure measurement may allow determining the current rough position of the elevator car within a sufficiently small inaccuracy length or a sufficiently small inaccuracy altitude interval. Additionally, the named measured air pressure could be compared to an air pressure at a reference point to neutralize effects of weather changes. Accordingly, having determined the current rough position of the elevator car based on the measured local air pressure, the current precise position of the elevator car may then be determined by additionally taking into account the first signal of the encoder. Air pressure measurements may be easily established using simple hardware such as electronic barometric sensors.

As a further alternative for determining the current rough position of the elevator car, according to an embodiment, the rough position indicator may generate the second signal by detecting RFID tags arranged at various positions along the travel path of the elevator car.

In other words, multiple RFID (radio frequency identification) tags may be arranged in the elevator hoistway along the travel path of the elevator car. For example, the RFID tags may be arranged at regular distance intervals. Each RFID tag may identify unique information. Based on this information, an identity and/or location information may be derived. On the elevator car, an RFID reader may be arranged. Accordingly, the RFID reader may read the information provided by the RFID tags and, based on this information, may determine the current rough position of the elevator car. Therein, the inaccuracy length generally corresponds to a distance between neighboring RFID tags.

As a further alternative for determining the current rough position of the elevator car, according to an embodiment, the rough position indicator may be designed as a precise laser distance measuring device which is in particular not very precise.

In the position determining arrangement according to the second aspect of the invention, the encoder and the rough position indicator may be operated such as to implement an embodiment of the above described position determination method. Therein, the encoder and the rough position indicator may be components which are included in the elevator arrangement originally for fulfilling other purposes. For example, the encoder may be provided for precisely controlling an operation of the drive engine's electric motor. The rough position indicator may for example use hardware originally serving for data communication and may apply this hardware for time-of-flight measurements for determining the rough position of the elevator car. Accordingly, no additional hardware may be necessarily required in the elevator arrangement, but existing hardware may be configured in an alternative manner for implementing the position determination method proposed herein.

The elevator arrangement according to the third aspect of the invention comprises the proposed position determining arrangement. Therein, in an advantageous embodiment the drive engine is configured for driving the elevator car by rotating a toothed drive disk engaging with a toothed belt connected to the elevator car and the encoder of the position determining arrangement is configured for generating the first signal such as to unambiguously correlate to a current orientation of the drive disk.

In such configuration, the current position of the elevator car is precisely mechanically correlated with the current orientation of the drive disk, as no slippage may occur between the toothed drive disk and the toothed belt.

According to a specific embodiment, the elevator arrangement comprises two separate drive engines and the position determining arrangement comprises two encoders, each encoder cooperating with one of the drive engines for providing a first signal based on the drive engine's current rotation orientation.

The elevator arrangement proposed herein may be configured with two drive engines. In such configuration, on the one hand, the two drive engines may be arranged and configured such that forces transmitted through the driven belts are applied to the elevator car in a distributed and preferably symmetric manner. On the other hand, as each drive engine has its own encoder, first signals may be provided by two encoders, thereby enabling a signal redundancy and finally improving a reliability in the determination of the current precise position of the elevator car.

It shall be noted that possible features and advantages of embodiments of the invention are described herein partly with respect to a position determining method, partly with respect to position determining arrangement and partly with respect to an elevator arrangement comprising such position determining arrangement. One skilled in the art will recognize that the features may be suitably transferred from one embodiment to another and features may be modified, adapted, combined and/or replaced, etc. in order to come to further embodiments of the invention.

In the following, advantageous embodiments of the invention will be described with reference to the enclosed drawings. However, neither the drawings nor the description shall be interpreted as limiting the invention.

The figures are only schematic and not to scale. Same reference signs refer to same or similar features.

DETAILED DESCRIPTION

Figure 1:
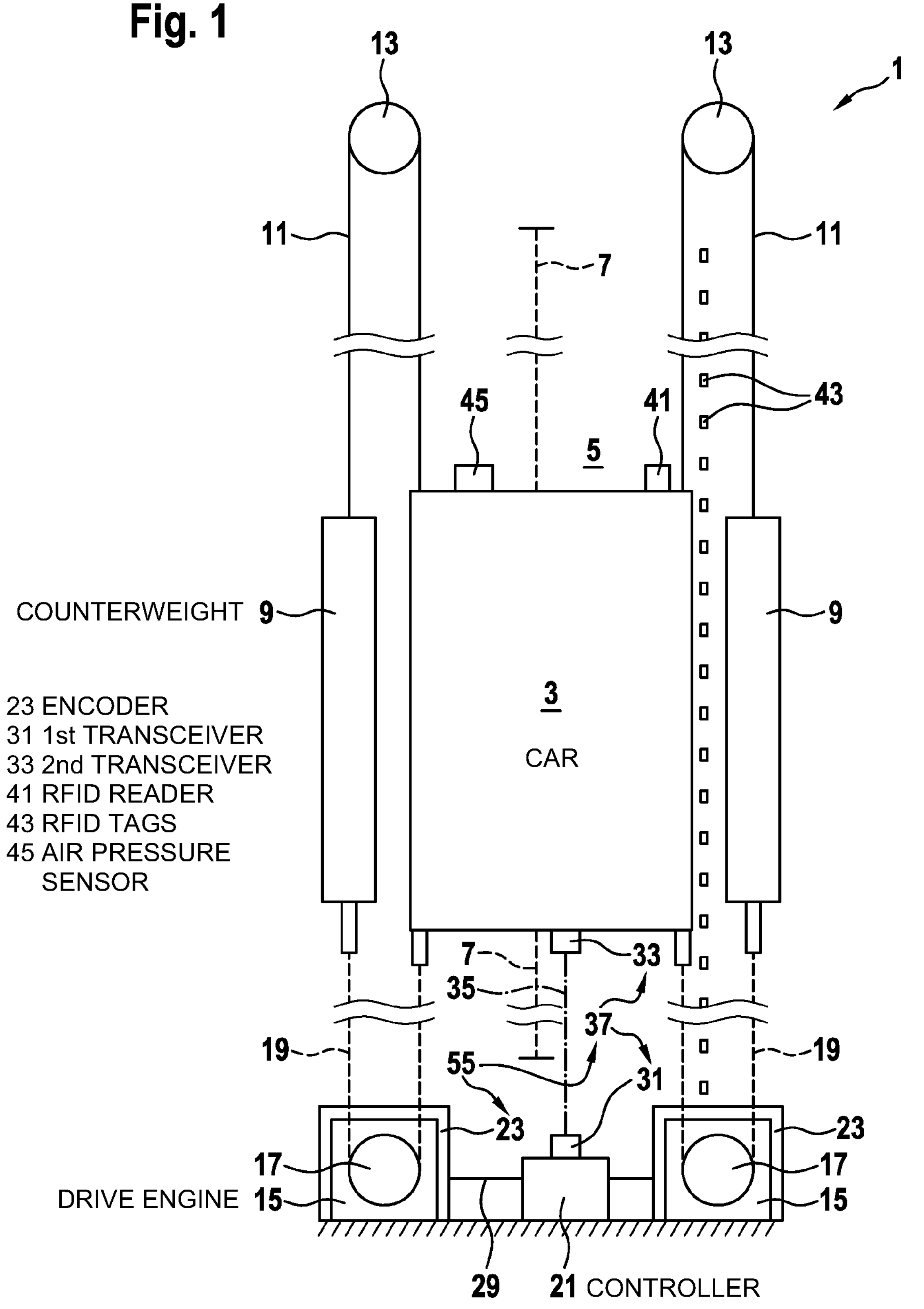
FIG. 1 shows an elevator arrangement comprising a position determining arrangement according to an embodiment of the present invention.

FIG. 1 shows an elevator arrangement 1. The elevator arrangement 1 comprises an elevator car 3 which may be displaced within an elevator hoistway 5 along a travel path 7. The elevator arrangement 1 further comprises two counterweights 9 travelling along travel paths arranged at opposite sides of the elevator car 3. Weights of the elevator car 3 and the counterweights 9 are suspended by suspension means 11 such as belts or ropes which are held at an upper end of the elevator hoistway 5 by pulleys 13.

The elevator car 3 and the counterweights 9 are displaced along the respective travel paths 7 using two drive engines 15. The drive engines 15 are arranged at a lower end of the hoistway 5. Each drive engine 15 comprises a toothed drive disk 17 driven into rotation by an electric motor. The toothed disc 17 engages with a toothed belt 19. One end of the toothed belt 19 is fixed to a lower end of one of the counterweights 9 whereas an opposite end of the toothed belt 19 is fixed to one side of a lower end of the elevator car 3.

An operation of both drive engines 15 is controlled by a controller 21. Particularly, the controller 21 communicates via a communication line 29 with an encoder 23 provided at each one of the drive engines 15.

Figure 2:
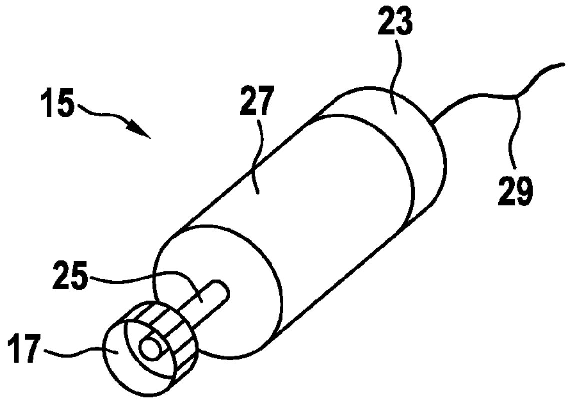
FIG. 2 shows a drive engine of an elevator arrangement according to an embodiment of the present invention.

As shown in FIG. 2, the toothed drive disk 17 of the drive engine 15 is coupled to a shaft 25 of a rotor of the drive engine's 15 electric motor 27. The electric motor 27 is controlled using, inter-alia, first signals provided by the encoder 23, these first signals indicating a current orientation of the rotor of the electric motor 27.

The encoder 23 may be a one revolution absolute encoder which may be provided in a very cost-effective manner. Therein, within one revolution, it is always possible to determine a current orientation of the rotor of the electric motor 27. Particularly, such orientation determination may be possible without having to rotate the rotor and the drive disk 17 attached thereto. The encoder 23 practically delivers a first signal 39 (FIG. 3) on the communication line 29 that may be proportional for example in degrees to the rotation status of the drive engine 15, i.e. to the current orientation of the rotor of the electric motor 27.

Figure 3:
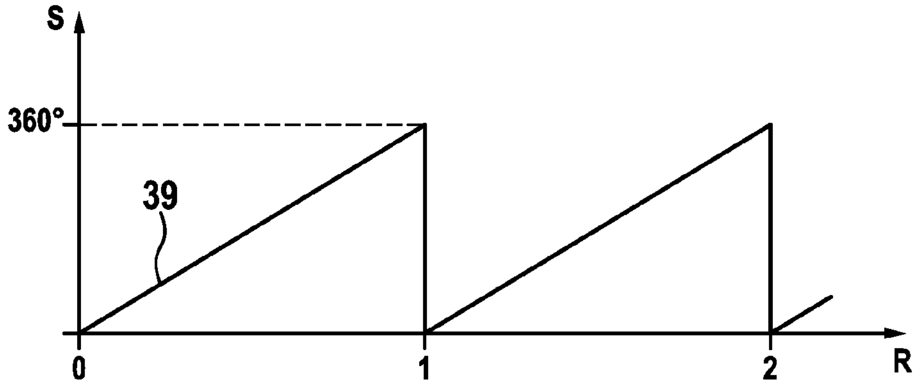
FIG. 3 shows signals of an encoder of a drive engine of an elevator arrangement according to an embodiment of the present invention.

FIG. 3 exemplarily shows a first signal 39 provided by the encoder 23 as a dependence of a signal strength S of the rotations R of the rotor of the electric motor 27. Upon a full rotation "1" of the rotor, the first signal 39 linearly increases from an initial value until the rotation reaches a 360° orientation. Upon further rotating the rotor, the first signal 39 restarts from its initial value. In other words, the first signal 39 provided by the encoder 23 repeats every 360°. Accordingly, upon continuously rotating the rotor over several rotations, the first signal 39 shows a saw-tooth pattern. Therein, within each single linear increase of the first signal 39, there is an unambiguous correlation between the first signal 39 and the current orientation of the rotor of the electric motor 27.

As the toothed drive disk 17 is driven by the electric motor 27 and engages without slippage with the toothed belt 19, ends of which are attached to the elevator car 3 and one of the counterweights 9, respectively, the rotation of the rotor of the electric motor 27 directly correlates with the current position of the elevator car 3.

In other words, there is a timing belt connection between each one of the drive engines 15 and the elevator car 3 that ensures that, beyond a possible load induced elongation of the toothed belt 19, the current position of the elevator car 3 may generally be determined precisely based on the first signal 39 provided by the encoder 23 indicating a current rotational status (=orientation) of the toothed drive disk 17 that drives the toothed belt 19.

However, as the first signal 39 of the encoder 23 only indicates the current rotational status of the electric motor 27, but not the number of full rotations executed by the electric motor 27, this first signal 39 alone may not be used to unambiguously determine the current precise position of the elevator car 3 along its entire travel path 7. Instead, based on this first signal 39, the position of the elevator car 3 may only be indicated within a partial hoistway range 53 (see FIG. 4) representing a fraction of the entire length of the travel path 7. Assuming for example a diameter of the drive disk 17 of 70 mm, one complete rotation of the rotor of the electric motor 27 corresponds to a shift of the actual position of the elevator car 3 of about 220 mm (70 mm*Pi), because the traction has a reeving factor of 1:1. Accordingly, in this example, based on the first signal 39 of the encoder 23 alone, the current position of the elevator car 3 may only be determined within a partial hoistway range 53 having a length of less than 220 mm.

In principle, it may be possible to determine the current precise position of the elevator car 3 throughout the entire length of the travel path 7 by additionally counting the full rotations performed by the drive engine 15 for example since determining an initial reference position of the elevator car 3. In such case, the number of rotations would have to be continuously tracked during the operation of the elevator arrangement 1.

However, there may be a risk that the information received by counting the rotations may be lost, for example as a result of a power loss in the elevator arrangement 1. In such case, upon for example the power supply being resumed, it would not be possible to determine the current position of the elevator car 3 along its travel path 7 only based on the first signal 39 provided by the encoder 23.

In order to overcome such problem, it is therefore suggested herein to determine the current precise position of the elevator car 3 with a two-step approach. Therein, a position determining arrangement 55 comprises the encoder 23 and a rough position indicator 37.

First, a current rough position of the elevator car 3 within the entire length of the hoistway 5 is determined based on a second signal provided by the rough position indicator 37. This rough position indicator 37 may indicate the position of the elevator car 3 within the entire hoistway length but suffers from a relatively low precision. For example, the rough position indicator 37 may provide position information only with a first inaccuracy length, i.e. with measurement values including a substantial error band.

Only after the current rough position of the elevator car 3 has been determined based on the second signals from the rough position indicator 37, the current precise position of the elevator car 3 is determined based on the first signal 39 provided by the encoder 23 and taking into account the previously determined current rough position.

In other words, the information provided by the encoder 23 indicating a precise position within one of a multiplicity of partial hoistway ranges 53 is supplemented using an absolute positioning system including the rough position indicator 37 that gives the absolute position of the elevator car 3 in the elevator hoistway 5 with a rough accuracy.

The rough position indicator 37 may preferably be implemented using components provided in the elevator arrangement 1 originally for other purposes.

For example, the elevator arrangement 1 may comprise a first transceiver 31 communicating with the controller 21 and being arranged at a stationary reference position within the elevator hoistway 5. Furthermore, the elevator arrangement 1 may comprise a second transceiver 33 communicating with components such as a car operation panel (COP) in the elevator car 3 and being attached to the elevator car 3. The first and second transceivers 31, 33 may establish a data communication path 35 via which the controller 21 may communicate with components in the elevator car 3.

For determining the current rough position of the elevator car 3, the first and second transceivers 31, 33 may be used for determining a current distance of the elevator car 3 carrying the second transceiver 33 from the stationary location of the first transceiver 31. For that purpose, one of the transceivers 31, 33 may emit an electromagnetic signal and a run-time required by this electromagnetic signal for travelling along the distance between the first transceiver 31 and the second transceiver 33 may be measured in a TOF measurement. The electromagnetic signal may be for example an ultra-wide-band signal.

As an alternative, the current rough position of the elevator car 3 may be determined by measuring a local air pressure at the current position of the elevator car 3 using an air pressure sensor 45.

As a further alternative, the current rough position of the elevator car 3 may be determined by detecting RFID tags 43 arranged at various positions along the travel path 7 of the elevator car 3 using an RFID reader 41 attached to the elevator car 3.

Before the position determining method described herein is applied during normal operation of an elevator arrangement 1, a learning procedure may be executed. In this learning procedure, a correlation relation between exact real positions of the elevator car 3 and the first signals 39 provided by the encoder 23 when the elevator car 3 is at a respective position may be learned for each of multiple positions along the entire travel path 7.

In other words, in the learning procedure, first data provided by the encoder 23, i.e. the first signals 39, second data provided by an absolute position determination device for example temporarily installed in the elevator arrangement during the learning trip and, optionally, third data provided by the rough position indicator 37 are acquired and set into a correlation in order to form a database referred to herein as correlation relation.

Figure 4:
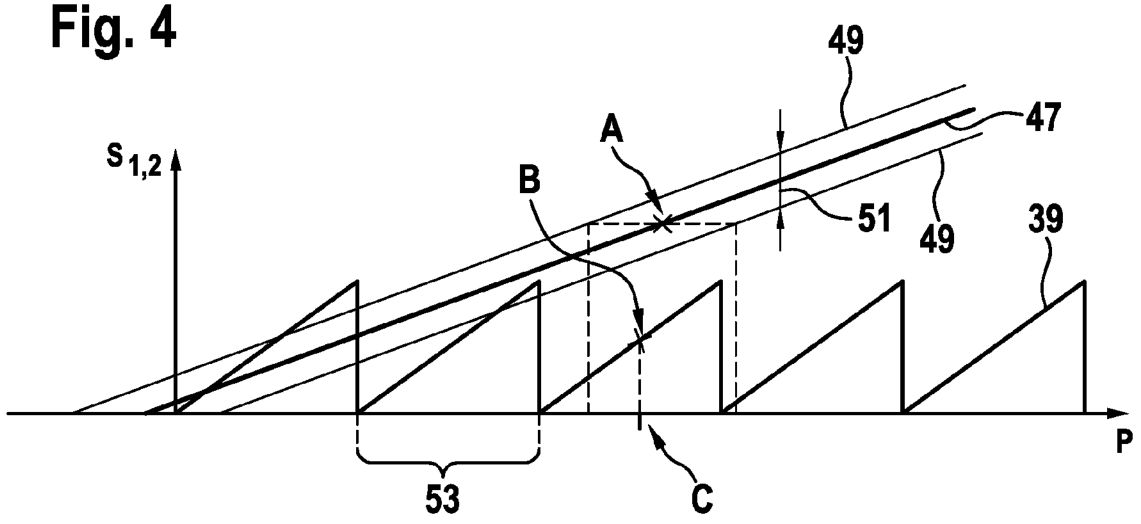
FIG. 4 shows a determination of the current precise position of an elevator car with a method according to an embodiment of the present invention.

FIG. 4 shows a graph of the first signal $S_1$ 39 generated by the encoder 23 and the second signal $S_2$ 47 generated by the rough position indicator 37 in dependence of the current exact real position P of the elevator car 3. Therein, the second signals 47 are acquired with a predetermined first inaccuracy length 51, thereby defining error bands 49 extending above and below the second signal 47.

In normal operation of the elevator arrangement 1, i.e. preferably after the correlation data has been learned in the learning procedure, the current precise position of the elevator car 3 may then be determined as follows:

- the current rough position is determined based on the second signals 47 from the rough position indicator 37 (reference point “A”). Particularly, it is determined in which one or neighboring two of the partial hoistway ranges 53 spanning the entire length of the travel path 7 the elevator car 3 is currently situated.

Then, based on the first signal 39 from the encoder 23, the orientation status of the drive disk 17 is determined (reference point "B").

Upon optionally additionally taking into account the correlation relation learned during the learning procedure, the current precise position of the elevator car 3 may be determined for example by finding the correct car position "C" from the graph that matches the partial hoistway a range 53 indicated by the rough position indicator 37 as well as the rotation orientation indicated by the encoder 23.

The method proposed herein allows precisely determining the current position of the elevator car 3 as long as the first inaccuracy length 51 describing the precision of determination of the current rough position is shorter than the partial hoistway ranges 53 in which the current precise position of the elevator car 3 may be determined based on the first signals 39 from the encoder 23. In other words, the proposed process works as long as the inaccuracy of the rough position indicator 37 is well below 50% of the distance travelled by the elevator car 3 within one rotation of the drive disk 17 of the drive engine 15. If this condition does not apply, it may not be possible to determine the precise positions of the elevator car 3 because the same imprecise position may map to two different precisely determined orientations of the drive disk 17.

Finally, it should be noted that the term "comprising" does not exclude other elements or steps and the "a" or "an" does not exclude a plurality. Also, elements described in association with different embodiments may be combined.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for determining a current precise position of an elevator car driven by a drive engine along an elevator hoistway of an elevator arrangement, the method comprising the steps of:

generating a first signal using an encoder cooperating with the drive engine, wherein the first signal indicates with a first precision a position of the elevator car within a partial hoistway range, the partial hoistway range extending along a fraction of an entire length of a travel path of the elevator car throughout the hoistway and the partial hoistway range being one of a plurality of directly neighboring partial hoistway ranges together extending along the entire length of the travel path;

generating a second signal using a rough position indicator, the second signal indicating with a second precision the position of the elevator car within the entire hoistway length, the second precision being lower than the first precision;

determining a current rough position of the elevator car within the entire hoistway length based on the second signal, the current rough position deviating from an exact real position of the elevator car by up to a first inaccuracy length;

determining the current precise position of the elevator car within the entire hoistway length based on the first signal and taking into account the current rough position, the current precise position deviating from the exact real position of the elevator car by up to a second inaccuracy length being smaller than the first inaccuracy length;

determining, based on the second signal, as the current rough position in which one or neighboring two of the plurality of partial hoistway ranges the elevator car is currently situated and subsequently, based on the first signal, determining as the current precise position where in the selected one or neighboring two partial hoistway ranges the elevator car is currently situated;

wherein the drive engine drives the elevator car along the hoistway by rotating a drive disk engaging with a belt connected to the elevator car; and wherein the partial hoistway ranges each correspond to a distance travelled by the elevator car during one revolution of the drive engine and the encoder generates the first signal correlating to a current rotational orientation of the drive disk.

2. The method according to claim 1 wherein the partial hoistway ranges are longer than the first inaccuracy length.

3. The method according to claim 1 including executing a learning procedure prior to a normal operation of the elevator arrangement, wherein during the learning procedure, a learned correlation relation between a current exact real position of the elevator car and the first signal is learned at each of multiple positions along the entire travel path of the elevator car, and wherein the method further comprises determining the current precise position of the elevator car within the entire hoistway length taking into account the learned correlation relation.

4. The method according to claim 1 wherein the drive disk is a toothed drive disk and the belt is a toothed belt.

5. The method according to claim 1 wherein the rough position indicator generates the second signal by measuring a distance between a fixed position in the elevator hoistway and the elevator car using a contactless measuring technique.

6. The method according to claim 1 wherein the rough position indicator generates the second signal by measuring a run-time required by an electromagnetic signal for travelling along a distance between a fixed position in the elevator hoistway and the elevator car.

7. The method according to claim 6 wherein the electromagnetic signal is an ultra-wide-band signal.

8. The method according to claim 1 wherein the rough position indicator generates the second signal by measuring a local air pressure in the hoistway at a current position of the elevator car.

9. The method according to claim 1 wherein the rough position indicator generates the second signal by detecting RFID tags arranged at various positions along the travel path of the elevator car.

10. A position determining arrangement for determining a current precise position of an elevator car driven by a drive engine along an elevator hoistway of an elevator arrangement, the position determining arrangement comprising:

an encoder cooperating with the drive engine to generate a first signal indicating with a first precision a position of the elevator car within a partial hoistway range, the partial hoistway range extending along a fraction of an entire length of a travel path of the elevator car throughout the hoistway and the partial hoistway range being one of a plurality of directly neighboring partial hoistway ranges together extending along the entire length of the travel path; and a rough position indicator generating a second signal indicating with a second precision the position of the elevator car within the entire hoistway length, the second precision being lower than the first precision; and wherein the position determining arrangement is adapted to perform the method according to claim 1.

11. An elevator arrangement comprising:

an elevator car movable in a hoistway;

a drive engine driving the elevator car along the elevator hoistway; and a position determining arrangement according to claim 10 for determining the current precise position of the elevator car within the elevator hoistway.

12. The elevator arrangement according to claim 11 wherein the drive engine drives the elevator car by rotating a toothed drive disk engaging with a toothed belt connected to the elevator car and wherein the encoder of the position determining arrangement generates the first signal correlating to a current rotational orientation of the drive disk.

13. The elevator arrangement according to claim 11 including two of the drive engine driving the elevator car and wherein the position determining arrangement includes two of the encoder, each of the encoders cooperating with an associated one of the drive engines to generate respective ones of the first signal based on a current rotational orientation of the associated drive engine.

14. The elevator arrangement according to claim 13 including an elevator controller controlling operation of the drive engines, the elevator controller receiving the first signals for determining the current precise position of the elevator car.

* * * * *